US012228194B2

(12) United States Patent
Patel et al.

(10) Patent No.: US 12,228,194 B2
(45) Date of Patent: *Feb. 18, 2025

(54) MULTI-SPEED PLANETARY TRANSMISSION

(71) Applicant: Allison Transmission, Inc., Indianapolis, IN (US)

(72) Inventors: Nayan Patel, Avon, IN (US); Jerry Suiter, Indianapolis, IN (US); Conrad Rockey, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,803

(22) Filed: May 1, 2023

(65) Prior Publication Data

US 2023/0265913 A1 Aug. 24, 2023

Related U.S. Application Data

(63) Continuation of application No. 17/766,835, filed as application No. PCT/US2020/054235 on Oct. 5, 2020, now Pat. No. 11,674,565.

(Continued)

(51) Int. Cl.
*F16H 3/66* (2006.01)
(52) U.S. Cl.
CPC ......... *F16H 3/66* (2013.01); *F16H 2200/006* (2013.01); *F16H 2200/2012* (2013.01); *F16H 2200/2046* (2013.01)

(58) Field of Classification Search
CPC ............... F16H 3/66; F16H 2200/006; F16H 2200/2012; F16H 2200/2046
(Continued)

(56) References Cited

U.S. PATENT DOCUMENTS

| 6,955,627 B2 | 10/2005 | Thomas et al. |
| 7,163,484 B2 | 1/2007 | Klemen |

(Continued)

FOREIGN PATENT DOCUMENTS

| CN | 103423389 A | 12/2013 |
| CN | 104114901 A | 10/2014 |

(Continued)

OTHER PUBLICATIONS

Allison Transmissions Will Work As Hard As You Do; Specialty Series; 2017.
(Continued)

*Primary Examiner* — Roger L Pang
(74) *Attorney, Agent, or Firm* — Faegre Drinker Biddle & Reath LLP

(57) ABSTRACT

A multi-speed transmission including a plurality of planetary gearsets and a plurality of selective couplers to achieve at least eight forward speed ratios is disclosed. The plurality of planetary gearsets may include a first planetary gearset, a second planetary gearset, a third planetary gearset, and a fourth planetary gearset. The plurality of selective couplers may include a number of clutches and a number of brakes. The multi-speed transmission may have four planetary gearsets and six selective couplers. The six selective couplers may include two clutches and four brakes.

22 Claims, 2 Drawing Sheets

Related U.S. Application Data

(60) Provisional application No. 62/911,580, filed on Oct. 7, 2019.

(58) Field of Classification Search
USPC .......................................... 475/275–492, 271
See application file for complete search history.

(56) References Cited

U.S. PATENT DOCUMENTS

| | | |
|---|---|---|
| 7,285,069 B2 | 10/2007 | Klemen |
| 7,785,225 B2 | 8/2010 | Phillips et al. |
| 8,083,631 B2 | 12/2011 | Shiohara |
| 8,277,356 B2 * | 10/2012 | Hart .................. F16H 3/66 475/284 |
| 8,292,767 B2 | 10/2012 | Borgerson et al. |
| 8,303,453 B2 | 11/2012 | Wittkopp et al. |
| 8,465,390 B2 | 6/2013 | Brehmer et al. |
| 8,480,533 B2 | 7/2013 | Meyer et al. |
| 8,485,934 B2 | 7/2013 | Gumpoltsberger et al. |
| 8,702,554 B2 | 4/2014 | Gumpoltsberger et al. |
| 8,715,128 B2 | 5/2014 | Kempf et al. |
| 8,715,129 B1 | 5/2014 | Coffey |
| 8,718,886 B2 | 5/2014 | Byerly et al. |
| 8,721,492 B2 * | 5/2014 | Fellmann ............. F16H 3/66 475/276 |
| 8,801,562 B2 | 8/2014 | Etchason |
| 8,801,563 B2 | 8/2014 | Ohnemus et al. |
| 8,827,862 B2 | 9/2014 | Koch et al. |
| 8,845,477 B2 | 9/2014 | Koch et al. |
| 8,864,618 B1 | 10/2014 | Noh et al. |
| 8,870,704 B2 | 10/2014 | Maurer et al. |
| 8,992,373 B2 | 3/2015 | Beck et al. |
| 9,175,747 B2 | 11/2015 | Lippert et al. |
| 9,291,244 B2 | 3/2016 | Lippert |
| 9,334,930 B2 | 5/2016 | Kaltenbach |
| 9,382,988 B2 | 7/2016 | Schoolcraft |
| 9,458,910 B2 | 10/2016 | Beck et al. |
| 9,625,007 B2 | 4/2017 | Long et al. |
| 9,644,724 B2 | 5/2017 | Schoolcraft |
| 9,670,994 B2 | 6/2017 | Park et al. |
| 9,759,299 B2 | 9/2017 | Beck et al. |
| 9,784,344 B1 | 10/2017 | Cho et al. |
| 9,810,287 B2 | 11/2017 | Briceno et al. |
| 9,869,372 B2 | 1/2018 | Goleski et al. |
| 9,933,047 B1 | 4/2018 | Cho et al. |
| 10,054,198 B2 | 8/2018 | Etchason |
| 10,132,388 B2 | 11/2018 | Briceno et al. |
| 10,156,284 B2 | 12/2018 | Warth et al. |
| 10,161,484 B2 | 12/2018 | Tryon et al. |
| 10,174,814 B2 | 1/2019 | Schoolcraft et al. |
| 10,323,722 B2 | 6/2019 | Schoolcraft et al. |
| 10,337,590 B2 | 7/2019 | Irving et al. |
| 10,344,836 B2 | 7/2019 | Kim et al. |
| 10,495,188 B2 | 12/2019 | Dersjo et al. |
| 10,626,958 B2 | 4/2020 | Crafton |
| 11,674,565 B2 * | 6/2023 | Patel .................. F16H 3/66 475/269 |
| 2010/0190600 A1 * | 7/2010 | Phillips .............. F16H 3/66 475/275 |
| 2012/0053004 A1 | 3/2012 | Beck et al. |
| 2013/0157796 A1 | 6/2013 | Etchason |
| 2013/0203550 A1 | 8/2013 | Mellet et al. |
| 2013/0225357 A1 | 8/2013 | Etchason |
| 2013/0267371 A1 | 10/2013 | Mellet et al. |
| 2014/0256500 A1 * | 9/2014 | Mellet ................. F16H 3/66 475/275 |
| 2016/0061304 A1 | 3/2016 | Kaltenbach et al. |
| 2017/0175855 A1 | 6/2017 | Etchason |
| 2017/0261075 A1 | 9/2017 | Cho et al. |
| 2019/0063559 A1 | 2/2019 | Raszkowski |
| 2019/0249755 A1 | 8/2019 | Crafton |
| 2022/0364629 A1 | 11/2022 | Patel et al. |

FOREIGN PATENT DOCUMENTS

| | | |
|---|---|---|
| CN | 107165994 A | 9/2017 |
| CN | 107664179 A | 2/2018 |
| DE | 102017203770 A1 | 9/2018 |
| EP | 3312465 A1 | 4/2018 |
| KR | 10-2013-0090349 A | 8/2013 |
| KR | 10-2018-0119849 A | 11/2018 |

OTHER PUBLICATIONS

Sherman, Don; Chevrolet Debuts Nine-Speed Automatic Slated for Malibu, Cruze Diesel, and New Equinox; Dec. 6, 2016.

Tinker, Matthew Michael; Wheel loader powertrain modeling for real-time vehicle dynamic simulation; Iowa Research Online; Jul. 2006.

Nezhadali, V. et al.; A framework for modeling and optimal control of automatic transmission systems; 2015.

Xu, Xiangyang et al.; Progress in Automotive Transmission Technology; Automotive Innovation; Aug. 23, 2018.

U.S. Patent and Trademark Office; International Search Report and Written Opinion; International Application No. PCT/US20/54235; mailed Jan. 11, 2021.

* cited by examiner

| GEAR | 162 | 164 | 166 | 168 | 170 | 172 |
|------|-----|-----|-----|-----|-----|-----|
| N    |     |     |     |     |     |     |
| 1st  |     | X   |     |     | X   |     |
| 2nd  | X   |     |     |     | X   |     |
| 3rd  |     | X   |     | X   |     |     |
| 4th  | X   |     |     |     |     | X   |
| 5th  | X   |     |     | X   |     |     |
| 6th  |     | X   |     |     |     | X   |
| 7th  | X   |     | X   |     |     |     |
| 8th  |     | X   | X   |     |     |     |

"X" = ENGAGED CONFIGURATION
"BLANK" = DISENGAGED CONFIGURATION

FIG. 2

MULTI-SPEED PLANETARY TRANSMISSION

RELATED APPLICATION

This application is a continuation of U.S. patent application Ser. No. 17/766,835, filed Apr. 6, 2022, titled MULTI-SPEED PLANETARY TRANSMISSION, which is a national stage application of PCT Application No. PCT/US2020/054235, filed Oct. 5, 2020, which claims the benefit of U.S. Provisional Application No. 62/911,580, filed Oct. 7, 2019, titled MULTI-SPEED PLANETARY TRANSMISSION, the entire disclosures of which are expressly incorporated by reference herein.

FIELD OF THE DISCLOSURE

The present disclosure relates to a multi-speed transmission and in particular to a multi-speed transmission including a plurality of planetary gearsets and a plurality of selective couplers to achieve at least eight forward speed ratios.

BACKGROUND OF THE DISCLOSURE

Multi-speed transmissions use a plurality of planetary gearsets, selective couplers, interconnectors, and additional elements to achieve a plurality of forward and reverse speed ratios. Exemplary multi-speed transmissions are disclosed in U.S. Pat. No. 9,625,007, Ser. No. 14/457,592, titled MULTI-SPEED TRANSMISSION, filed Aug. 12, 2014, the entire disclosure of which is expressly incorporated by reference herein.

SUMMARY

The present disclosure provides a multi-speed transmission including a plurality of planetary gearsets and a plurality of selective couplers to achieve at least eight forward speed ratios wherein the output member rotates in the same direction as the input member. The plurality of planetary gearsets may include a first planetary gearset, a second planetary gearset, a third planetary gearset, and a fourth planetary gearset. The plurality of selective couplers may include a number of clutches and a number of brakes. In one example, the present disclosure provides a multi-speed transmission having four planetary gearsets and six selective couplers. The six selective couplers may include two clutches and four brakes.

In some instances throughout this disclosure and in the claims, numeric terminology, such as first, second, third, and fourth, is used in reference to various gearsets, gears, gearset components, interconnectors, selective couplers, and other components. Such use is not intended to denote an ordering of the components. Rather, numeric terminology is used to assist the reader in identifying the component being referenced and should not be narrowly interpreted as providing a specific order of components. For example, a first planetary gearset identified in the drawings may support any one of the plurality of planetary gearsets recited in the claims, including the first planetary gearset, the second planetary gearset, the third planetary gearset, and the fourth planetary gearset, depending on the language of the claims.

According to an exemplary embodiment of the present disclosure, a transmission is provided. The transmission comprising at least one stationary member; an input member rotatable relative to the at least one stationary member; a plurality of planetary gearsets operatively coupled to the input member; an output member operatively coupled to the input member through the plurality of planetary gearsets and rotatable relative to the at least one stationary member; a first interconnector, a second interconnector, and a plurality of selective couplers. Each of the plurality of planetary gearsets including a first gearset component, a second gearset component, and a third gearset component. The plurality of planetary gearsets including a first planetary gearset, a second planetary gearset, a third planetary gearset, and a fourth planetary gearset. The input member is fixedly coupled to the third gearset component of the first planetary gearset. The output member is fixedly coupled to the third gearset component of the fourth planetary gearset and to the second gearset component of the third planetary gearset. The first interconnector fixedly couples the second gearset component of the first planetary gearset, the first gearset component of the second planetary gearset, and the first gearset component of the third planetary gearset together. The second interconnector fixedly couples the second gearset component of the second planetary gearset, the third gearset component of the third planetary gearset, and the second gearset component of the fourth planetary gearset together. The plurality of selective couplers includes: a first selective coupler which, when engaged, fixedly couples the first gearset component of the first planetary gearset to the input member; a second selective coupler which, when engaged, fixedly couples the first gearset component of the first planetary gearset to the at least one stationary member; a third selective coupler which, when engaged, fixedly couples the second gearset component of the first planetary gearset, the first gearset component of the second planetary gearset, and the first gearset component of the third planetary gearset to the third gearset component of the second planetary gearset; a fourth selective coupler which, when engaged, fixedly couples the third gearset component of the second planetary gearset to the at least one stationary member; a fifth selective coupler which, when engaged, fixedly couples the second gearset component of the second planetary gearset, the third planetary component of the third planetary gearset, and the second gearset component of the fourth planetary gearset to the at least one stationary member; and a sixth selective coupler which, when engaged, fixedly couples the first gearset component of the fourth planetary gearset to the at least one stationary member.

In an example thereof, each of the first planetary gearset, the second planetary gearset, the third planetary gearset, and the fourth planetary gearset is a simple planetary gearset. In a variation thereof, the first gearset component of the first planetary gearset is a first sun gear, the first gearset component of the second planetary gearset is a second sun gear, the first gearset component of the third planetary gearset is a third sun gear, the first gearset component of the fourth planetary gearset is a fourth sun gear, the second gearset component of the first planetary gearset is a first planet carrier, the second gearset component of the second planetary gearset is a second planet carrier, the second gearset component of the third planetary gearset is a third planet carrier, the second gearset component of the fourth planetary gearset is a fourth planet carrier, the third gearset component of the first planetary gearset is a first ring gear, the third gearset component of the second planetary gearset is a second ring gear, the third gearset component of the third planetary gearset is a third ring gear, and the third gearset component of the fourth planetary gearset is a fourth ring gear.

In another example thereof, the at least one stationary member includes a housing, the housing having a first end and a second end, wherein the input member is accessible proximate the first end of the housing; the output member is accessible proximate the second end of the housing; the first planetary gearset is positioned between the first end of the housing and the second planetary gearset; the second planetary gearset is positioned between the first planetary gearset and the third planetary gearset; the third planetary gearset is positioned between the second planetary gearset and the fourth planetary gearset; and the fourth planetary gearset is positioned between the third planetary gearset and the second end of the housing.

In a further example thereof, the plurality of selective couplers are selectively engaged in a plurality of combinations to establish at least eight forward speed ratios between the input member and the output member, each of the plurality of combinations having at least two of the plurality of selective couplers engaged.

In a further still example thereof, the second selective coupler and fifth selective coupler are engaged to establish a first forward speed ratio.

In a yet further example thereof, the first selective coupler and fifth selective coupler are engaged to establish a second forward speed ratio.

In still a further example thereof, the second selective coupler and fourth selective coupler are engaged to establish a third forward speed ratio.

In still another example thereof, the second selective coupler and sixth selective coupler are engaged to establish a fourth forward speed ratio.

In yet another example thereof, the first selective coupler and fourth selective coupler are engaged to establish a fifth forward speed ratio.

In still yet another example thereof, the first selective coupler and sixth selective coupler are engaged to establish a sixth forward speed ratio.

In a still further example thereof, the second selective coupler and third selective coupler are engaged to establish a seventh forward speed ratio.

In a further still example thereof, the first selective coupler and third selective coupler are engaged to establish an eighth forward speed ratio.

In a yet further still example thereof, the second selective coupler and fifth selective coupler are engaged to establish a first forward speed ratio; the first selective coupler and fifth selective coupler are engaged to establish a second forward speed ratio; the second selective coupler and fourth selective coupler are engaged to establish a third forward speed ratio; the second selective coupler and sixth selective coupler are engaged to establish a fourth forward speed ratio; the first selective coupler and fourth selective coupler are engaged to establish a fifth forward speed ratio; the first selective coupler and sixth selective coupler are engaged to establish a sixth forward speed ratio; the second selective coupler and third selective coupler are engaged to establish a seventh forward speed ratio; and the first selective coupler and third selective coupler are engaged to establish an eighth forward speed ratio.

In another exemplary embodiment of the present disclosure, a transmission is provided. The transmission comprising: at least one stationary member; an input member rotatable relative to the at least one stationary member; a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the first planetary gearset; an output member operatively coupled to the input member through the plurality of planetary gearsets and rotatable relative to the at least one stationary member, the output member is fixedly coupled to both the third planetary gearset and the fourth planetary gearset; a plurality of interconnectors which fixedly couple the first planetary gearset to both the second planetary gearset and the third planetary gearset and which fixedly couple the fourth planetary gearset to the second planetary gearset; a plurality of selective couplers operatively coupled to the plurality of planetary gearsets, each of the plurality of selective couplers having an engaged configuration and a disengaged configuration, the plurality of selective couplers including a first number of clutches and a second number of brakes; and wherein the plurality of selective couplers are selectively engaged in a plurality of combinations to establish a plurality of forward speed ratios, each of the plurality of combinations having two of the plurality of selective couplers engaged.

In an example thereof, the plurality of interconnectors includes a first interconnector which fixedly couples the second gearset component of the first planetary gearset, the first gearset component of the second planetary gearset, and the first gearset component of the third planetary gearset together.

In another example thereof, the plurality of interconnectors includes a second interconnector which fixedly couples the second gearset component of the second planetary gearset, the third gearset component of the third planetary gearset, and the second gearset component of the fourth planetary gearset together.

In a further example thereof, the plurality of interconnectors includes a first interconnector which fixedly couples the second gearset component of the second planetary gearset, the third gearset component of the third planetary gearset, and the second gearset component of the fourth planetary gearset together.

In still another example thereof, the plurality of interconnectors includes a first interconnector which fixedly couples a majority of the plurality of planetary gearsets together.

In yet a further example thereof, the second number of brakes is greater than the first number of clutches. In a variation thereof, the second number of brakes is equal to four. In a further variation thereof, the second number of brakes is a multiple of the first number of clutches. In a still further variation thereof, the plurality of selective couplers includes a first selective coupler which, when engaged, fixedly couples the first gearset component of the first planetary gearset to the input member. In still another variation thereof, the plurality of selective couplers includes a first selective coupler which, when engaged, fixedly couples at least two gearset components of the same planetary gearset together. In a further still variation thereof, the plurality of selective couplers includes a second selective coupler which, when engaged, fixedly couples the first gearset component of the first planetary gearset to the at least one stationary member. In another still variation thereof, the plurality of selective couplers includes a third selective coupler which, when engaged, fixedly couples the second gearset component of the first planetary gearset, the first gearset component of the second planetary gearset, and the first gearset component of the third planetary gearset to the third gearset component of the second planetary gearset. In yet another variation thereof, the plurality of selective couplers includes a fourth selective coupler which, when engaged, fixedly couples the third gearset component of the second planetary gearset to the at least one stationary member. In still yet another variation thereof, the plurality of selective couplers includes a fifth selective coupler which, when engaged, fixedly couples the second gearset component of the second planetary gearset, the third planetary component of the third planetary gearset, and the second gearset component of the fourth planetary gearset to the at least one stationary member. In yet still a further variation thereof, the plurality of selective couplers includes a sixth selective coupler which, when engaged, fixedly couples the first gearset component of the fourth planetary gearset to the at least one stationary member. In a still further variation thereof, the plurality of selective couplers includes a first selective coupler which, when engaged, fixedly couples a majority of the plurality of planetary gearsets to the stationary member.

In yet another example thereof, the plurality of selective couplers includes: a first selective coupler which, when engaged, fixedly couples the first gearset component of the first planetary gearset to the input member; a second selective coupler which, when engaged, fixedly couples the first gearset component of the first planetary gearset to the at least one stationary member; a third selective coupler which, when engaged, fixedly couples the second gearset component of the first planetary gearset, the first gearset component of the second planetary gearset, and the first gearset component of the third planetary gearset to the third gearset component of the second planetary gearset; a fourth selective coupler which, when engaged, fixedly couples the third gearset component of the second planetary gearset to the at least one stationary member; a fifth selective coupler which, when engaged, fixedly couples the second gearset component of the second planetary gearset, the third planetary component of the third planetary gearset, and the second gearset component of the fourth planetary gearset to the at least one stationary member; and a sixth selective coupler which, when engaged, fixedly couples the first gearset component of the fourth planetary gearset to the at least one stationary member. In a variation thereof, the second selective coupler and fifth selective coupler are engaged to establish a first forward speed ratio. In another variation thereof, the first selective coupler and fifth selective coupler are engaged to establish a second forward speed ratio. In a further variation, the second selective coupler and fourth selective coupler are engaged to establish a third forward speed ratio. In yet another variation thereof, the second selective coupler and sixth selective coupler are engaged to establish a fourth forward speed ratio. In yet a further variation thereof, the first selective coupler and fourth selective coupler are engaged to establish a fifth forward speed ratio. In still a further variation thereof, the first selective coupler and sixth selective coupler are engaged to establish a sixth forward speed ratio. In yet a further variation thereof, the second selective coupler and third selective coupler are engaged to establish a seventh forward speed ratio. In a further still variation thereof, the first selective coupler and third selective coupler are engaged to establish an eighth forward speed ratio. In yet a further still variation thereof, the second selective coupler and fifth selective coupler are engaged to establish a first forward speed ratio; the first selective coupler and fifth selective coupler are engaged to establish a second forward speed ratio; the second selective coupler and fourth selective coupler are engaged to establish a third forward speed ratio; the second selective coupler and sixth selective coupler are engaged to establish a fourth forward speed ratio; the first selective coupler and fourth selective coupler are engaged to establish a fifth forward speed ratio; the first selective coupler and sixth selective coupler are engaged to establish a sixth forward speed ratio; the second selective coupler and third selective coupler are engaged to establish a seventh forward speed ratio; and the first selective coupler and third selective coupler are engaged to establish an eighth forward speed ratio.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 2 is a truth table illustrating the selective engagement of the six selective couplers of FIG. 1 to provide eight forward gear or speed ratios of the multi-speed transmission of FIG. 1.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
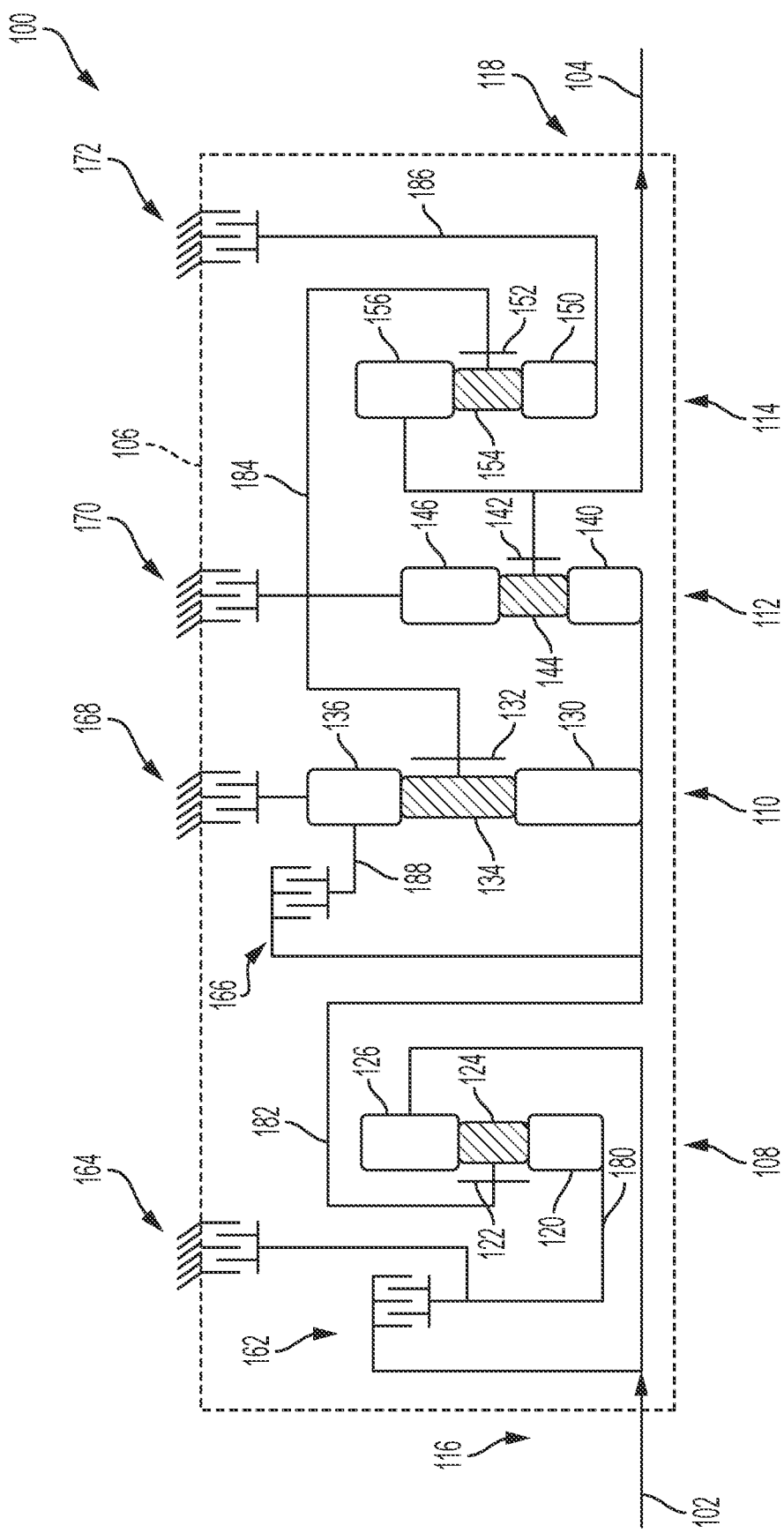
FIG. 1 is a diagrammatic view of an exemplary multi-speed transmission including four planetary gearsets and six selective couplers.

For the purposes of promoting an understanding of the principles of the present disclosure, reference is now made to the embodiment illustrated in the drawings, which is described below. The embodiment disclosed below is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

In the disclosed transmission embodiment, selective couplers are disclosed. A selective coupler is a device which may be actuated to fixedly couple two or more components together. A selective coupler fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in the above-incorporated U.S. Pat. No. 9,625,007.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

The disclosed transmission embodiments include a plurality of planetary gearsets. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn intermeshed with the teeth of the ring gear. Each of these components may also be referred to as a gearset component. It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier.

One or more rotating components, such as shafts, drums, and other components, may be collectively referred to as an interconnector when the one or more components are fixedly coupled together. Interconnectors may further be fixedly coupled to one or more gearset components and/or one or more selective couplers.

An input member of the disclosed transmission embodiments is rotated by a prime mover. Exemplary prime movers include internal combustion engines, electric motors, hybrid power systems, and other suitable power systems. In one embodiment, the prime mover indirectly rotates the input member through a clutch and/or a torque converter. An output member of the disclosed transmission embodiments provides rotational power to one or more working components. Exemplary working components include one or more drive wheels of a motor vehicle, a power take-off shaft, a pump, and other suitable devices. The output member is rotated based on the interconnections of the gearset components and the selective couplers of the transmission. By changing the interconnections of the gearset components and the selective couplers, a rotation speed of the output member may be varied from a rotation speed of the input member.

The disclosed transmission embodiment is capable of transferring torque from the input member to the output member and rotating the output member in at least eight forward gear or speed ratios relative to the input member, illustratively eight forward gear or speed ratios. The architecture disclosed herein may be utilized to achieve various gear ratios based on the characteristics of the gearsets utilized. Exemplary characteristics include respective gear diameters, the number of gear teeth, and the configurations of the various gears.

FIG. 1 is a diagrammatic representation of a multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. An exemplary output member 104 is an output shaft or other suitable rotatable component. An exemplary stationary member 106 is a housing of multi-speed transmission 100. The housing may include several components coupled together.

Multi-speed transmission 100 includes a plurality of planetary gearsets, illustratively a first planetary gearset 108, a second planetary gearset 110, a third planetary gearset 112, and a fourth planetary gearset 114. In one embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments.

In one embodiment, multi-speed transmission 100 is arranged as illustrated in FIG. 1, with first planetary gearset 108 positioned between a first location or end 116 at which input member 102 enters stationary member 106 and second planetary gearset 110, second planetary gearset 110 is positioned between first planetary gearset 108 and third planetary gearset 112, third planetary gearset 112 is positioned between second planetary gearset 110 and fourth planetary gearset 114, and fourth planetary gearset 114 is positioned between third planetary gearset 112 and a second location or end 118 at which output member 104 exits stationary member 106. In alternative embodiments, first planetary gearset 108, second planetary gearset 110, third planetary gearset 112, and fourth planetary gearset 114 are arranged in any order relative to location 116 and location 118. In embodiments, each of first planetary gearset 108, second planetary gearset 110, third planetary gearset 112, and fourth planetary gearset 114 are axially aligned. In one example, input member 102 and output member 104 are also axially aligned with first planetary gearset 108, second planetary gearset 110, third planetary gearset 112, and fourth planetary gearset 114. In alternative embodiments, one or more of input member 102, output member 104, first planetary gearset 108, second planetary gearset 110, third planetary gearset 112, and fourth planetary gearset 114 are offset and not axially aligned with the remainder.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162 and third selective coupler 166 are clutches and second selective coupler 164, fourth selective coupler 168, fifth selective coupler 170, and sixth selective coupler 172 are brakes. The axial locations of the clutches and brakes relative to the plurality of planetary gearsets may be altered from the illustrated axial locations.

Multi-speed transmission 100 includes several components that are illustratively shown as being fixedly coupled together. Input member 102 is fixedly coupled to ring gear 126 of first planetary gearset 108 and first selective coupler 162. Output member 104 is fixedly coupled to planet carrier 142 of third planetary gearset 112 and ring gear 156 of fourth planetary gearset 114. Sun gear 120 of first planetary gearset 108 is fixedly coupled to first selective coupler 162 and second selective coupler 164. Planet carrier 122 of first planetary gearset 108 is fixedly coupled to third selective coupler 166, sun gear 130 of second planetary gearset 110, and sun gear 140 of third planetary gearset 112. Planet carrier 132 of second planetary gearset 110 is fixedly coupled to ring gear 146 of third planetary gearset 112, planet carrier 152 of fourth planetary gearset 114, and fifth selective coupler 170. Ring gear 136 of second planetary gearset 110 is fixedly coupled to third selective coupler 166 and fourth selective coupler 168. Sun gear 150 of fourth planetary gearset 114 is fixedly coupled to sixth selective coupler 172. In alternative embodiments, one or more of the components fixedly coupled together are selectively coupled together through one or more selective couplers.

Multi-speed transmission 100 may be described as having seven interconnectors. Input member 102 is a first interconnector that both provides input torque to multi-speed transmission 100 and fixedly couples ring gear 126 of first planetary gearset 108 to first selective coupler 162. Output member 104 is a second interconnector that both provides output torque from multi-speed transmission 100 and fixedly couples ring gear 156 of fourth planetary gearset 114 to planet carrier 142 of third planetary gearset 112. A third interconnector 180 fixedly couples sun gear 120 of first planetary gearset 108, first selective coupler 162, and second selective coupler 164 together. A fourth interconnector 182 fixedly couples planet carrier 122 of first planetary gearset 108, sun gear 130 of second planetary gearset 110, sun gear 140 of third planetary gearset 112, and third selective coupler 166 together. A fifth interconnector 184 fixedly couples planet carrier 132 of second planetary gearset 110, ring gear 146 of third planetary gearset 112, planet carrier 152 of fourth planetary gearset 114, and fifth selective coupler 170 together. A sixth interconnector 186 fixedly couples sun gear 150 of fourth planetary gearset 114 and sixth selective coupler 172 together. A seventh interconnector 188 fixedly couples ring gear 136 of second planetary gearset 110 and third selective coupler 166 together.

Multi-speed transmission 100 further includes several components that are illustratively shown as being selectively coupled together through selective couplers. First selective coupler 162, when engaged, fixedly couples ring gear 126 of first planetary gearset 108 and input member 102 to second selective coupler 164 and sun gear 120 of first planetary gearset 108. When first selective coupler 162 is engaged, sun gear 120 and ring gear 126 of first planetary gearset 108 are locked together. Therefore, sun gear 120, planet carrier 122, and ring gear 126 of first planetary gearset 108 all rotate together as a single unit. The same effect may be realized by coupling any two of sun gear 120, planet carrier 122, and ring gear 126 of first planetary gearset 108 together. When first selective coupler 162 is disengaged, input member 102 and ring gear 126 of first planetary gearset 108 may rotate relative to third selective coupler 164 and sun gear 120 of first planetary gearset 108.

Second selective coupler 164, when engaged, fixedly couples first selective coupler 162 and sun gear 120 of first planetary gearset 108 to stationary member 106. When second selective coupler 164 is disengaged, first selective coupler 162 and sun gear 120 of first planetary gearset 108 may rotate relative to stationary member 106.

Third selective coupler 166, when engaged, fixedly couples planet carrier 122 of first planetary gearset 108, sun gear 130 of second planetary gearset 110, sun gear 140 of third planetary gearset 112 to ring gear 136 of second planetary gearset 110. When third selective coupler 166 is engaged, sun gear 130 and ring gear 136 of second planetary gearset 110 are locked together. Therefore, sun gear 130, planet carrier 132, and ring gear 136 of second planetary gearset 110 all rotate together as a single unit. The same effect may be realized by coupling any two of sun gear 130, planet carrier 132, and ring gear 136 of second planetary gearset 110 together. When third selective coupler 166 is disengaged, planet carrier 122 of first planetary gearset 108, sun gear 130 of second planetary gearset 110, and sun gear 140 of third planetary gearset 112 may rotate relative to ring gear 136 of second planetary gearset 110.

Fourth selective coupler 168, when engaged, fixedly couples ring gear 136 of second planetary gearset 110 to at least one stationary member 106. When fourth selective coupler 168 is disengaged, ring gear 136 of second planetary gearset 110 may rotate relative to at least one stationary member 106.

Fifth selective coupler 170, when engaged, fixedly couples planet carrier 132 of second planetary gearset 110, ring gear 146 of third planetary gearset 112, and planet carrier 152 of fourth planetary gearset 114 to at least one stationary member 106. When fifth selective coupler 170 is disengaged, planet carrier 132 of second planetary gearset 110, ring gear 146 of third planetary gearset 112, and planet carrier 152 of fourth planetary gearset 114 may rotate relative to at least one stationary member 106.

Sixth selective coupler 172, when engaged, fixedly couples sun gear 150 of fourth planetary gearset 114 to at least one stationary member 106. When sixth selective coupler 172 is disengaged, sun gear 150 of fourth planetary gearset 114 may rotate relative to at least one stationary member 106.

By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together.

The plurality of planetary gearsets and the plurality of selective couplers of multi-speed transmission 100 may be interconnected in various arrangements to provide torque from input member 102 to output member 104 in at least eight forward gear or speed ratios. Referring to FIG. 2, an exemplary truth table 200 is shown that provides the state of each of first selective coupler 162, second selective coupler 164, third selective coupler 166, fourth selective coupler 168, fifth selective coupler 170, and sixth selective coupler 172 for eight different forward gear or speed ratios. Each row corresponds to a given interconnection arrangement for transmission 100. The first column provides the gear range ($1^{st}$-$8^{th}$ forward gears). The remaining columns illustrate which ones of the selective couplers 162-172 are engaged ("X" indicates engaged) and which ones of selective couplers 162-172 are disengaged ("(blank)" indicates disengaged). FIG. 2 is only one example of any number of truth tables possible for achieving at least eight forward ratios. Although not provided in truth table 200, various reverse gear ratios are also possible with multi-speed transmission 100.

In the example of FIG. 2, to place multi-speed transmission 100 in neutral (N), all of first selective coupler 162, second selective coupler 164, third selective coupler 166, fourth selective coupler 168, fifth selective coupler 170, and sixth selective coupler 172 are in the disengaged configuration. One or more of first selective coupler 162, second selective coupler 164, third selective coupler 166, fourth selective coupler 168, fifth selective coupler 170, and sixth selective coupler 172 may remain engaged in neutral (Neu) as long as the combination of first selective coupler 162, second selective coupler 164, third selective coupler 166, fourth selective coupler 168, fifth selective coupler 170, and sixth selective coupler 172 does not transmit torque from input member 102 to output member 104.

A first forward ratio (shown as 1st) in truth table 200 of FIG. 2 is achieved by having second selective coupler 164 and fifth selective coupler 170 in an engaged configuration and first selective coupler 162, third selective coupler 166, fourth selective coupler 168, and sixth selective coupler 172 in a disengaged configuration.

A second or subsequent forward ratio (shown as 2nd) in truth table 200 of FIG. 2 is achieved by having first selective coupler 162 and fifth selective coupler 170 in an engaged configuration and second selective coupler 164, third selective coupler 166, fourth selective coupler 168, and sixth selective coupler 172 in a disengaged configuration. Therefore, when transitioning between the first forward ratio and the second forward ratio, second selective coupler 164 is placed in the disengaged configuration and first selective coupler 162 is placed in the engaged configuration.

A third or subsequent forward ratio (shown as 3rd) in truth table 200 of FIG. 2 is achieved by having second selective coupler 164 and fourth selective coupler 168 in an engaged configuration and first selective coupler 162, third selective coupler 166, fifth selective coupler 170, and sixth selective coupler 172 in a disengaged configuration. Therefore, when transitioning between the second forward ratio and the third forward ratio, both first selective coupler 162 and fifth selective coupler 170 placed in the disengaged configuration and both second selective coupler 164 and fourth selective coupler 168 are placed in the engaged configuration. In the exemplary embodiment shown, placing both first selective coupler 162 and fifth selective coupler 170 in the disengaged configuration and both second selective coupler 164 and fourth selective coupler 168 in the engaged configuration occurs simultaneously. It is contemplated, however, that this transition may be staged or occur sequentially.

A fourth or subsequent forward ratio (shown as 4th) in truth table 200 of FIG. 2 is achieved by having second selective coupler 164 and sixth selective coupler 172 in an engaged configuration and first selective coupler 162, third selective coupler 166, fourth selective coupler 168, and fifth selective coupler 170 in a disengaged configuration. Therefore, when transitioning between the third forward ratio and the fourth forward ratio, fourth selective coupler 168 is placed in the disengaged configuration and sixth selective coupler 172 is placed in the engaged configuration.

A fifth or subsequent forward ratio (shown as 5th) in truth table 200 of FIG. 2 is achieved by having first selective coupler 162 and fourth selective coupler 168 in an engaged configuration and second selective coupler 164, third selective coupler 166, fifth selective coupler 170, and sixth selective coupler 172 in a disengaged configuration. Therefore, when transitioning between the fourth forward ratio and the fifth forward ratio, both second selective coupler 164 and sixth selective coupler 172 are placed in the disengaged configuration and both first selective coupler 162 and fourth selective coupler 168 are placed in the engaged configuration. In the exemplary embodiment shown, placing both second selective coupler 164 and sixth selective coupler 172 in the disengaged configuration and both first selective coupler 162 and fourth selective coupler 168 in the engaged configuration occurs simultaneously. It is contemplated, however, that this transition may be staged or occur sequentially.

A sixth or subsequent forward ratio (shown as 6th) in truth table 200 of FIG. 2 is achieved by having first selective coupler 162 and sixth selective coupler 172 in an engaged configuration and second selective coupler 164, third selective coupler 166, fourth selective coupler 168, and fifth selective coupler 170 in a disengaged configuration. Therefore, when transitioning between the fifth forward ratio and the sixth forward ratio, fourth selective coupler 168 is placed in the disengaged configuration and sixth selective coupler 172 is placed in the engaged configuration.

A seventh or subsequent forward ratio (shown as 7th) in truth table 200 of FIG. 2 is achieved by having second selective coupler 164 and third selective coupler 166 in an engaged configuration and first selective coupler 162, fourth selective coupler 168, fifth selective coupler 170, and sixth selective coupler 172 in a disengaged configuration. Therefore, when transitioning between the sixth forward ratio and the seventh forward ratio, both first selective coupler 162 and sixth selective coupler 172 are placed in the disengaged configuration and both second selective coupler 164 and third selective coupler 166 are placed in the engaged configuration. In the exemplary embodiment shown, placing both first selective coupler 162 and sixth selective coupler 172 in the disengaged configuration and both second selective coupler 164 and third selective coupler 166 in the engaged configuration occurs simultaneously. It is contemplated, however, that this transition may be staged or occur sequentially.

An eighth or subsequent forward ratio (shown as 8th) in truth table 200 of FIG. 2 is achieved by having first selective coupler 162 and third selective coupler 166 in an engaged configuration and second selective coupler 164, fourth selective coupler 168, fifth selective coupler 170, and sixth selective coupler 172 in a disengaged configuration. Therefore, when transitioning between the seventh forward ratio and the eighth forward ratio, second selective coupler 164 is placed in the disengaged configuration and first selective coupler 162 is placed in the engaged configuration.

The present disclosure contemplates that downshifts follow the reverse sequence of the corresponding upshift (as described above). Further, several power-on skip-shifts that are single-transition are possible (e.g. from $1^{st}$ up to $3^{rd}$, from $3^{rd}$ down to $1^{st}$, from $3^{rd}$ up to $5^{th}$, and from $5^{th}$ down to $3^{rd}$).

In the illustrated embodiment, various combinations of two of the available selective couplers are engaged for each of the illustrated forward speed ratios. Additional forward speed ratios and reverse speed ratios are possible based on other combinations of engaged selective couplers. Although in the illustrated embodiment, each forward speed ratio has two of the available selective couplers engaged, it is contemplated that less than two and more than two selective couplers may be engaged at the same time.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
    at least one stationary member;
    an input member rotatable relative to the at least one stationary member;
    a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the third gearset component of the first planetary gearset, the third gearset component of each of the plurality of planetary gearsets being a ring gear;
    an output member operatively coupled to the input member through the plurality of planetary gearsets and rotatable relative to the at least one stationary member, the output member is fixedly coupled to both the third planetary gearset and the third gearset component of the fourth planetary gearset;
    a plurality of interconnectors which fixedly couple the first planetary gearset to both the second planetary gearset and the third planetary gearset and which fixedly couple the fourth planetary gearset to the second planetary gearset; and
    a plurality of selective couplers operatively coupled to the plurality of planetary gearsets, each of the plurality of selective couplers having an engaged configuration and a disengaged configuration, the plurality of selective couplers including a first number of clutches and a second number of brakes.

2. The transmission of claim 1, wherein when one of the plurality of selective couplers, when engaged, fixedly couples the first gearset component of the first planetary gearset to the at least one stationary member, the first gearset component of the first planetary gearset is a sun gear.

3. The transmission of claim 2, wherein the plurality of interconnectors comprises a first interconnector which fixedly couples the second gearset component of the second planetary gearset, the third gearset component of the third planetary gearset, and the second gearset component of the fourth planetary gearset together.

4. The transmission of claim 2, wherein the output member is fixedly coupled to the second gearset component of the third planetary gearset.

5. The transmission of claim 1, wherein the first gearset component of the second planetary gearset and the first gearset component of the third planetary gearset are fixedly coupled together.

6. The transmission of claim 5, wherein the first gearset component of the second planetary gearset and the first gearset component of the third planetary gearset are each a sun gear.

7. The transmission of claim 5, wherein the second gearset component of the second planetary gearset and the third gearset component of the third planetary gearset are fixedly coupled together.

8. The transmission of claim 7, wherein the second gearset component of the fourth planetary gearset and the third gearset component of the third planetary gearset are fixedly coupled together.

9. The transmission of claim 5, wherein the second gearset component of the first planetary gearset and the first gearset component of the third planetary gearset are fixedly coupled together.

10. A transmission comprising:
    at least one stationary member including a housing having a first end and a second end;
    an input member rotatable relative to the at least one stationary member and positioned proximate the first end of the housing;
    a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the third gearset component of the first planetary gearset, and the third gearset component of the first planetary gearset is the same type of gearset component as the third gearset component of the fourth planetary gearset;
    an output member operatively coupled to the input member through the plurality of planetary gearsets and rotatable relative to the at least one stationary member, the output member positioned proximate the second end of the housing, the output member is fixedly coupled to the second gearset component of the third planetary gearset and to the third gearset component of the fourth planetary gearset, the third planetary gearset being positioned between the second planetary gearset and the fourth planetary gearset and the fourth planetary gearset being positioned between the third planetary gearset and the second end of the housing;
    a plurality of interconnectors which fixedly couple the first planetary gearset to both the second planetary gearset and the third planetary gearset and which fixedly couple together a same type of gearset component of the fourth planetary gearset and the second planetary gearset; and
    a plurality of selective couplers operatively coupled to the plurality of planetary gearsets, each of the plurality of selective couplers having an engaged configuration and a disengaged configuration, the plurality of selective couplers including a first number of clutches and a second number of brakes.

11. The transmission of claim 10, wherein when one of the plurality of selective couplers, when engaged, fixedly couples the first gearset component of the first planetary gearset to the at least one stationary member, the first gearset component of the first planetary gearset is a sun gear.

12. The transmission of claim 10, wherein the first gearset component of the second planetary gearset and the first gearset component of the third planetary gearset are fixedly coupled together.

13. The transmission of claim 12, wherein the first gearset component of the second planetary gearset and the first gearset component of the third planetary gearset are each a sun gear.

14. The transmission of claim 12, wherein the second gearset component of the second planetary gearset and the third gearset component of the third planetary gearset are fixedly coupled together.

15. The transmission of claim 14, wherein the second gearset component of the fourth planetary gearset and the third gearset component of the third planetary gearset are fixedly coupled together.

16. The transmission of claim 12, wherein the second gearset component of the first planetary gearset and the first gearset component of the third planetary gearset are fixedly coupled together.

17. The transmission of claim 10, wherein each of the plurality of gearsets is a simple gearset.

18. The transmission of claim 10, wherein the second number is greater than the first number.

19. The transmission of claim 18, wherein the second number is twice the first number.

20. A transmission comprising:
   at least one stationary member including a housing having a first end and a second end;
   an input member rotatable relative to the at least one stationary member and positioned proximate the first end of the housing;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the third gearset component of the first planetary gearset;
   an output member operatively coupled to the input member through the plurality of planetary gearsets and rotatable relative to the at least one stationary member, the output member positioned proximate the second end of the housing, the output member is fixedly coupled to the second gearset component of the third planetary gearset and to the third gearset component of the fourth planetary gearset, the third planetary gearset being positioned between the second planetary gearset and the fourth planetary gearset and the fourth planetary gearset being positioned between the third planetary gearset and the second end of the housing;
   a plurality of interconnectors which fixedly couple the first planetary gearset to both the second planetary gearset and the third planetary gearset and which fixedly couple the fourth planetary gearset to the second planetary gearset; and
   a plurality of selective couplers operatively coupled to the plurality of planetary gearsets, each of the plurality of selective couplers having an engaged configuration and a disengaged configuration, the plurality of selective couplers including a first number of clutches and a second number of brakes,
   wherein the first gearset component of the second planetary gearset and the first gearset component of the third planetary gearset are fixedly coupled together, and wherein the first gearset component of the second planetary gearset and the first gearset component of the third planetary gearset are each a sun gear.

21. A transmission comprising:
   at least one stationary member including a housing having a first end and a second end;
   an input member rotatable relative to the at least one stationary member and positioned proximate the first end of the housing;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the third gearset component of the first planetary gearset;
   an output member operatively coupled to the input member through the plurality of planetary gearsets and rotatable relative to the at least one stationary member, the output member positioned proximate the second end of the housing, the output member is fixedly coupled to the second gearset component of the third planetary gearset and to the third gearset component of the fourth planetary gearset, the third planetary gearset being positioned between the second planetary gearset and the fourth planetary gearset and the fourth planetary gearset being positioned between the third planetary gearset and the second end of the housing;
   a plurality of interconnectors which fixedly couple the first planetary gearset to both the second planetary gearset and the third planetary gearset and which fixedly couple the fourth planetary gearset to the second planetary gearset; and
   a plurality of selective couplers operatively coupled to the plurality of planetary gearsets, each of the plurality of selective couplers having an engaged configuration and a disengaged configuration, the plurality of selective couplers including a first number of clutches and a second number of brakes,
   wherein the first gearset component of the second planetary gearset and the first gearset component of the third planetary gearset are fixedly coupled together, and wherein the second gearset component of the second planetary gearset and the third gearset component of the third planetary gearset are fixedly coupled together.

22. A transmission comprising:
   at least one stationary member including a housing having a first end and a second end;
   an input member rotatable relative to the at least one stationary member and positioned proximate the first end of the housing;
   a plurality of planetary gearsets operatively coupled to the input member, each of the plurality of planetary gearsets including a first gearset component, a second gearset component, and a third gearset component, the plurality of planetary gearsets including a first planetary gearset, a second planetary gearset, a third planetary gearset, and a fourth planetary gearset, the input member is fixedly coupled to the third gearset component of the first planetary gearset;
   an output member operatively coupled to the input member through the plurality of planetary gearsets and rotatable relative to the at least one stationary member, the output member positioned proximate the second end of the housing, the output member is fixedly coupled to the second gearset component of the third planetary gearset and to the third gearset component of the fourth planetary gearset, the third planetary gearset being positioned between the second planetary gearset and the fourth planetary gearset, the fourth planetary gearset being positioned between the third planetary gearset and the second end of the housing, and the first planetary gearset being positioned between the second planetary gearset and the first end of the housing;

a plurality of interconnectors which fixedly couple the first planetary gearset to both the second planetary gearset and the third planetary gearset and which fixedly couple the fourth planetary gearset to the second planetary gearset; and a plurality of selective couplers operatively coupled to the plurality of planetary gearsets, each of the plurality of selective couplers having an engaged configuration and a disengaged configuration, the plurality of selective couplers including a first number of clutches and a second number of brakes, the second number being greater than the first number.

* * * * *